United States Patent
Cho et al.

(10) Patent No.: US 10,116,770 B2
(45) Date of Patent: Oct. 30, 2018

(54) IMAGE PROCESSING APPARATUS BASED ON OPEN PLATFORM AND PROTOCOL CONVERSION METHOD USED FOR THE SAME

(71) Applicant: HANWHA TECHWIN CO.,LTD., Changwon-si (KR)

(72) Inventors: Sung-Bong Cho, Changwon-si (KR); Sung-Hoon Lee, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 350 days.

(21) Appl. No.: 14/450,826

(22) Filed: Aug. 4, 2014

(65) Prior Publication Data

US 2015/0131001 A1     May 14, 2015

(30) Foreign Application Priority Data

Nov. 14, 2013   (KR) .................. 10-2013-0138360

(51) Int. Cl.
H04L 29/06         (2006.01)
H04N 7/01          (2006.01)

(52) U.S. Cl.
CPC .......... H04L 69/08 (2013.01); H04N 7/0117 (2013.01); H04N 7/0127 (2013.01)

(58) Field of Classification Search
CPC .. H04N 7/00–7/56; H04N 19/40; H04L 69/08
See application file for complete search history.

(56) References Cited

U.S. PATENT DOCUMENTS 7,191,462 B1 * 3/2007 Roman ............... H04N 7/17318
                                              348/E7.071
8,000,329 B2 * 8/2011 Fendick .................. H04L 45/00
                                                    370/392
8,606,942 B2 * 12/2013 Perlman .................. A63F 13/12
                                                    709/203

(Continued)

FOREIGN PATENT DOCUMENTS

JP        2010-532631 A     10/2010
KR   10-2010-0078217 A      7/2010

(Continued)

*Primary Examiner* — Sean Motsinger
(74) *Attorney, Agent, or Firm* — Sughrue Mion, PLLC

(57) ABSTRACT

Provided is an image processing apparatus and method that may employ a new program or protocol without having to additionally develop a new program or a protocol for image processing. The image processing apparatus may include: an open platform-compatible unit configured to determine a protocol that is used by a video analysis application installed in or connected to the image processing apparatus, and receive at least one of channel information about an original image, channel information about an encoded image, channel information about a decoded image, resolution information about the decoded image and frame rate information that is required to receive the decoded image, in accordance with the determined protocol; and a protocol conversion unit configured to process an input image to comply with the determined protocol, based on the at least one information that is received at the open platform-compatible unit.

17 Claims, 3 Drawing Sheets

(56) References Cited

U.S. PATENT DOCUMENTS

| | | | |
|---|---|---|---|
| 8,850,498 B1* | 9/2014 | Roach | H04N 21/2347 375/240.27 |
| 2002/0158879 A1* | 10/2002 | Broghammer | G06F 3/14 345/555 |
| 2003/0206242 A1* | 11/2003 | Choi | G09G 5/006 348/441 |
| 2004/0083301 A1* | 4/2004 | Murase | H04N 7/17318 709/231 |
| 2007/0024705 A1* | 2/2007 | Richter | H04N 7/17318 348/142 |
| 2007/0024706 A1* | 2/2007 | Brannon, Jr. | H04N 7/17318 348/142 |
| 2007/0118556 A1* | 5/2007 | Arnold | G06F 17/211 |
| 2008/0317130 A1* | 12/2008 | Akiyama | H04N 7/014 375/240.16 |
| 2009/0019367 A1* | 1/2009 | Cavagnari | G06F 21/62 715/716 |
| 2010/0166068 A1* | 7/2010 | Perlman | A63F 13/355 375/240.12 |
| 2011/0105226 A1* | 5/2011 | Perlman | A63F 13/12 463/30 |
| 2011/0116124 A1* | 5/2011 | Shin | H04L 12/66 358/1.15 |
| 2011/0191320 A1* | 8/2011 | Glover | G06F 17/30 707/706 |
| 2012/0133778 A1* | 5/2012 | Shih | H04N 7/185 348/169 |
| 2012/0266157 A1 | 10/2012 | Mun et al. | |
| 2012/0284009 A1* | 11/2012 | De Florio | G06F 8/10 703/22 |
| 2013/0185318 A1* | 7/2013 | Hirai | G06F 17/3089 707/756 |
| 2013/0204664 A1* | 8/2013 | Romagnolo | G06Q 30/0203 705/7.32 |
| 2015/0006226 A1* | 1/2015 | Smith | G06Q 10/06313 705/7.23 |
| 2015/0131001 A1* | 5/2015 | Cho | H04N 7/0117 348/445 |

FOREIGN PATENT DOCUMENTS

| | | |
|---|---|---|
| KR | 10-2011-0136874 A | 12/2011 |
| KR | 10-2012-0079952 A | 7/2012 |
| KR | 10-2012-0118353 A | 10/2012 |

* cited by examiner

IMAGE PROCESSING APPARATUS BASED ON OPEN PLATFORM AND PROTOCOL CONVERSION METHOD USED FOR THE SAME

CROSS-REFERENCE TO RELATED APPLICATION

This application claims priority from Korean Patent Application No. 10-2013-0138360, filed on Nov. 14, 2013, in the Korean Intellectual Property Office, the disclosure of which is incorporated herein in its entirety by reference.

BACKGROUND

1. Field

Apparatuses and methods consistent with exemplary embodiments of the inventive concept relate to image processing for supporting various image analysis methods or protocols.

2. Description of the Related Art

Most image processing apparatuses or image recording apparatuses such as a network video recorder (NVR), a digital video recorder (DVR), or a set-top box employ a standard protocol or support a particular protocol. Thus, if a new protocol or a new image analysis program is used, the new protocol or the new image analysis program may not interwork with the image processing apparatuses.

Particularly, in order to change or add an image analysis program or a protocol which is used by an image processing apparatus, it is necessary to inconveniently develop, compile, and install a new program or protocol in the image processing apparatus.

SUMMARY

One or more exemplary embodiments of the inventive concept include an interface that may employ a new program or protocol without having to additionally develop a new program or a protocol for an image processing apparatus.

Various aspects of the embodiments will be set forth in part in the description which follows and, in part, will be apparent from the description, or may be learned by practice of the presented embodiments.

According to an aspect of an exemplary embodiment, there is provided an image processing apparatus based on an open platform which may include: an open platform-compatible unit configured to determine a protocol that is used by a video analysis application installed in or connected to the image processing apparatus, and receive at least one of channel information about an original image, channel information about an encoded image, channel information about a decoded image, resolution information about the decoded image and frame rate information that is required to receive the decoded image, in accordance with the determined protocol; and a protocol conversion unit configured to process an input image to comply with the determined protocol, based on the at least one information that is received at the open platform-compatible unit. The protocol conversion unit may include: a reception unit configured to receive an image that the open platform-compatible unit requests based on the received at least one information; a decoding unit configured to decode the received image; and at least one of a resizing unit configured to change a resolution of the decoded image according to the determined protocol and a resampling unit configured to change a frame rate of the decoded image according to the determined protocol. The protocol conversion unit may further include: a storing unit configured to store a part or whole of the decoded image; and a transmission unit configured to transmit an image output from the at least one of the resizing unit and the resampling unit.

The open platform-compatible unit may request the input image from a channel selected from among a plurality of channels based on the determined protocol.

The open platform-compatible unit may be configured to select channel information to receive from among the channel information about the original image, the channel information about the encoded image and the channel information about the decoded image, according to the determined protocol.

If the channel information about the decoded image is received, the open platform-compatible unit may receive the resolution information about the decoded image and the frame rate information.

According to an aspect of another exemplary embodiment, there is provided a protocol conversion method used at an image processing apparatus based on an open platform which may include: determining a protocol that is used by a video analysis application installed in or connected to an image processing apparatus; receiving at least one of channel information about an original image, channel information about an encoded image, channel information about a decoded image, resolution information about the decoded image and frame rate information that is required to receive the decoded image, in accordance with the determined protocol; and processing an input image to comply with the determined protocol based on the at least one information that is received at the open platform-compatible unit. The processing may include: receiving an image that the open platform-compatible unit requests based on the received at least one information; decoding the received image; changing, according to the determined protocol, at least one of a resolution of the decoded image and a frame rate of the decoded image; storing a part or whole of the decoded image; and transmitting an image output from the changing.

BRIEF DESCRIPTION OF THE DRAWINGS

The above and other features and advantages of the exemplary embodiments will become apparent and more readily appreciated from the following description of the embodiments, taken in conjunction with the accompanying drawings in which.

DETAILED DESCRIPTION OF THE EXEMPLARY EMBODIMENTS

Figure 1:
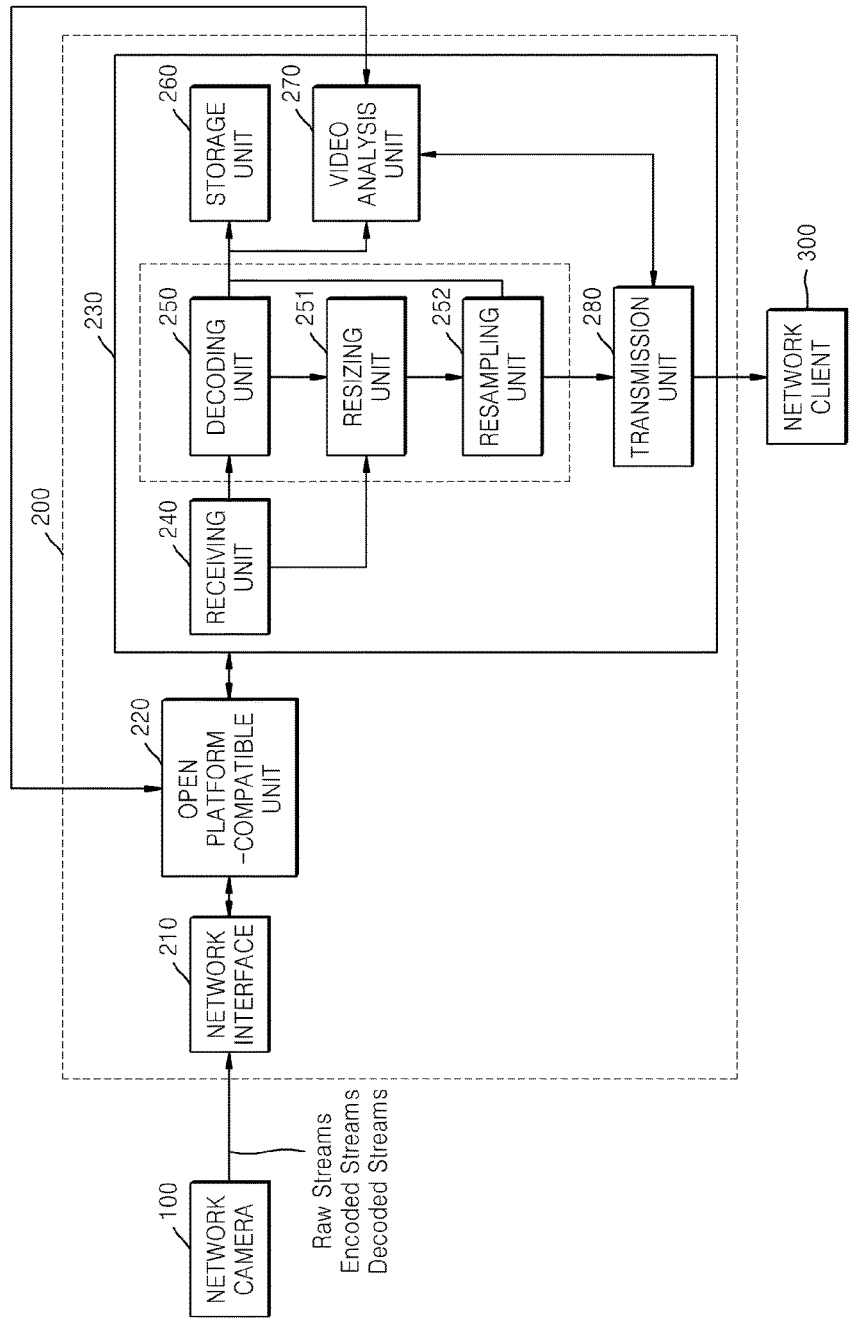
FIG. 1 illustrates a configuration of an image processing apparatus based on an open platform according to an exemplary embodiment.

Reference will now be made in detail to exemplary embodiments which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed. Expressions such as "at least one of," when preceding a list of elements, modify the entire list of elements and do not modify the individual elements of the list.

The following description and accompanying drawings are provided for better understanding of the inventive concept. In the following description, well-known functions or constructions are not described in detail if it is determined that they would obscure the inventive concept due to unnecessary detail.

The following description and drawings are not intended to restrict the scope of the inventive concept, which should be defined by the appended claims. The terms used in the following description are merely used to describe particular embodiments of the inventive concept and are not intended to limit the inventive concept.

FIG. 1 illustrates a configuration of an image processing apparatus based on an open platform, according to an exemplary embodiment. In FIG. 1, an image processing apparatus 200 is connected to a network camera 100 and a network client 300.

According to the present embodiment, the image processing apparatus 200 based on an open platform processes video, audio, or metadata information, which is input from the network camera 100, and transmits the video, audio, or metadata information to the network client 300.

The image processing apparatus 200 based on an open platform may perform encoding, decoding, and/or video analysis on encoded or decoded video, audio, and metadata information, which are input from the network camera 100 that is wired or wirelessly connected to the image processing apparatus 200 based on an open platform.

Examples of the image processing apparatus 200 based on an open platform may be a network video recorder (NVR), a digital video recorder (DVR), or a set-top box. According to an exemplary embodiment, the image processing apparatus 200 based on an open platform supports various types of video analysis applications and protocols. Thus, the image processing apparatus 200 based on an open platform may be compatible with a protocol that does not comply with a standard specification.

Referring to FIG. 1, the image processing apparatus 200 based on an open platform includes an open platform-compatible unit 220 and a protocol conversion unit 230. The image processing apparatus 200 based on an open platform may be configured to further include a network interface 210.

Preferably but not necessarily, the protocol conversion unit 230 includes at least one of a receiving unit 240, a decoding unit 250, a resizing unit 251, a resampling unit 252, a storage unit 260, a video analysis unit 270, and a transmission unit 280.

According to an exemplary embodiment, if the video analysis unit 270 performs face recognition, a video analysis application that processes the face recognition with a display having a resolution of 704×480 pixels at a frame rate of seven frames per second may be used. In this case, the open platform-compatible unit 220 requests the image processing apparatus 200, e.g. an NVR 200, for an image with a resolution of 704×480 pixels at a frame rate of seven frames per second through a channel No. 1, in accordance with a protocol of the video analysis application.

In this case, the NVR 200 receives an image from the network camera 100 through the channel No. 1. However, if the image that is transmitted from the network camera 100 through the channel No. 1. is an image having a resolution of 1920×1080 pixels at a frame rate of 60 frames per second, the protocol conversion unit 230 decodes the image that is received from the network camera 100 through the channel No. 1 via the decoding unit 250, converts a size of the image into a size of 704×480 pixels via the resizing unit 251, and resamples the image at a frame rate of seven frames per second via the resampling unit 251.

Then, the protocol conversion unit 230 transmits an image stream, that is obtained through the image processing as described above, to the video analysis unit 270. Also, the protocol conversion unit 230 may be configured such that a part or the whole image stream that is obtained through the image processing and/or information about an event generated from the received image is stored in the storage unit 260. Additionally, the transmission unit 280 may transmit a result of analysis by the video analysis unit 270, the image stream that is obtained through the image processing and/or the information about the event generated from the received image to the network client 300.

According to an exemplary embodiment, the various units or components illustrated in FIG. 1 process at least one function or operation as described above, and they may be implemented by hardware, software, or a combination of hardware and software. A function of each unit or component is as follows:

The open platform-compatible unit 220 requests at least one network camera 100 for necessary data such as an image according to a protocol that is used by the video analysis application. Preferably but not necessarily, the video analysis unit 270 may perform video analysis by using various video analysis applications. Accordingly, if a type of a video analysis application is changed, data that is requested by the open platform-compatible unit 200 may also be changed.

As an example, the open platform-compatible unit 220 receives an image through a channel by requesting information about a channel, a resolution and/or a frame rate which corresponds to a protocol of a video analysis application, and performs image processing such as decoding, resampling and/or resizing on a received image, as necessary.

Examples of information requested by the open platform-compatible unit 220 include channel information about an original image, channel information about an encoded image, channel information about a decoded image, resolution information about the decoded image, and frame rate information that is required to receive the decoded image.

Preferably but not necessarily, the open platform-compatible unit 220 may be configured to select channel information to request, from among the channel information about the original image, the channel information about the encoded image and the channel information about the decoded image, according to a protocol that is used by each video analysis application.

Preferably but not necessarily, if the channel information about the decoded image is requested, the open platform-compatible unit 220 requests for both the resolution information about the decoded image and frame rate information that is required to receive the requested decoded image.

According to an exemplary embodiment, the open platform-compatible unit 220 may receive an image from at least one network camera 100. Also, according to a protocol that is used by each video analysis application, the open platform-compatible unit 220 determines a channel through which an image is received, whether an encoded image is to be received or a decoded image is to be received, and if a decoded image is to be received, a resolution and a frame rate at which the decoded image is to be received.

The protocol conversion unit 230 includes the reception unit 240 for receiving an image that is requested by the open platform-conversion unit 220, the decoding unit 250 for decoding the received image, the resizing unit 251 for changing a resolution of the decoded image, the resampling unit 252 for changing a frame rate of the decoded image of which the resolution is changed, the storage unit 260 for storing a part or the whole received image, and the transmission unit 270 for transmitting an image, which is converted to comply with a protocol that is used by each video analysis application, to the each video analysis application.

Preferably but not necessarily, the reception unit 240 and the network interface 210 may be implemented as one interface. The reception unit 240 may receive an original image captured by the network camera 100, an encoded image, and/or a decoded image.

According to another exemplary embodiment, an internal processor (not illustrated) in the image processing apparatus 200 based on an open platform supports an open platform module, as shown below, so as to implement the following functions of the open platform-compatible unit 220

Installation function: a function of installing a program that is developed according to an open platform.

Un-installation function: a function of uninstalling an installed open platform software (SW)

Program execution function: a function of executing an installed program

Program stop function: a function of stopping a program that is being executed

Program termination function: a function of terminating a program that is being executed Health check function: a function of checking if a program that is being executed is normally operating Stream request/response function: a function of receiving a request for a media stream from a program that is being executed Stream supplier function: a function of transmitting a media stream such as a YUV420 Stream or an encoded stream to a program that is being executed Graphical user interface (GUI) event listener function: a function of generating a GUI event from a program that is being executed to a main program, and outputting the GUI event on a screen Record event listener function: a function of generating a record event from a program that is being executed to a main program, and storing the record event in the storage unit 260

Metadata listener function: a function of transmitting metadata from a program that is being executed to a main program, and storing the metadata in the storage unit 260

Figure 2:
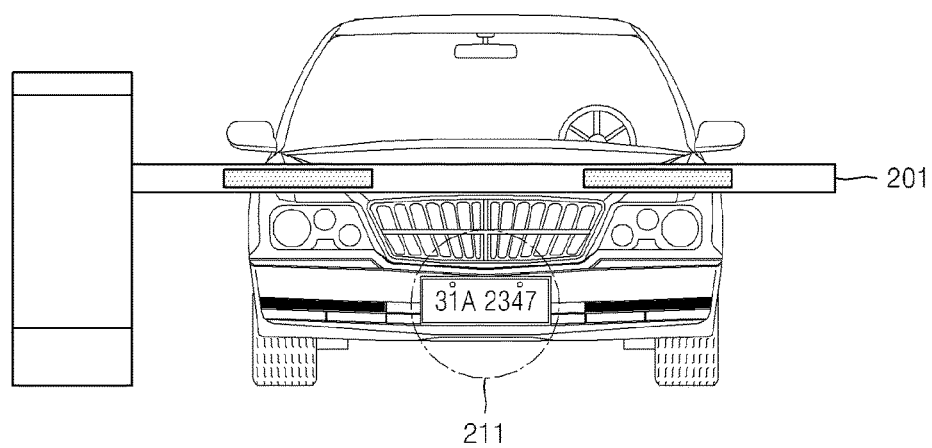
FIGS. 2 and 3 illustrate an example of a protocol conversion method used for the image processing apparatus based on an open platform according to an exemplary embodiment.
Figure 3:
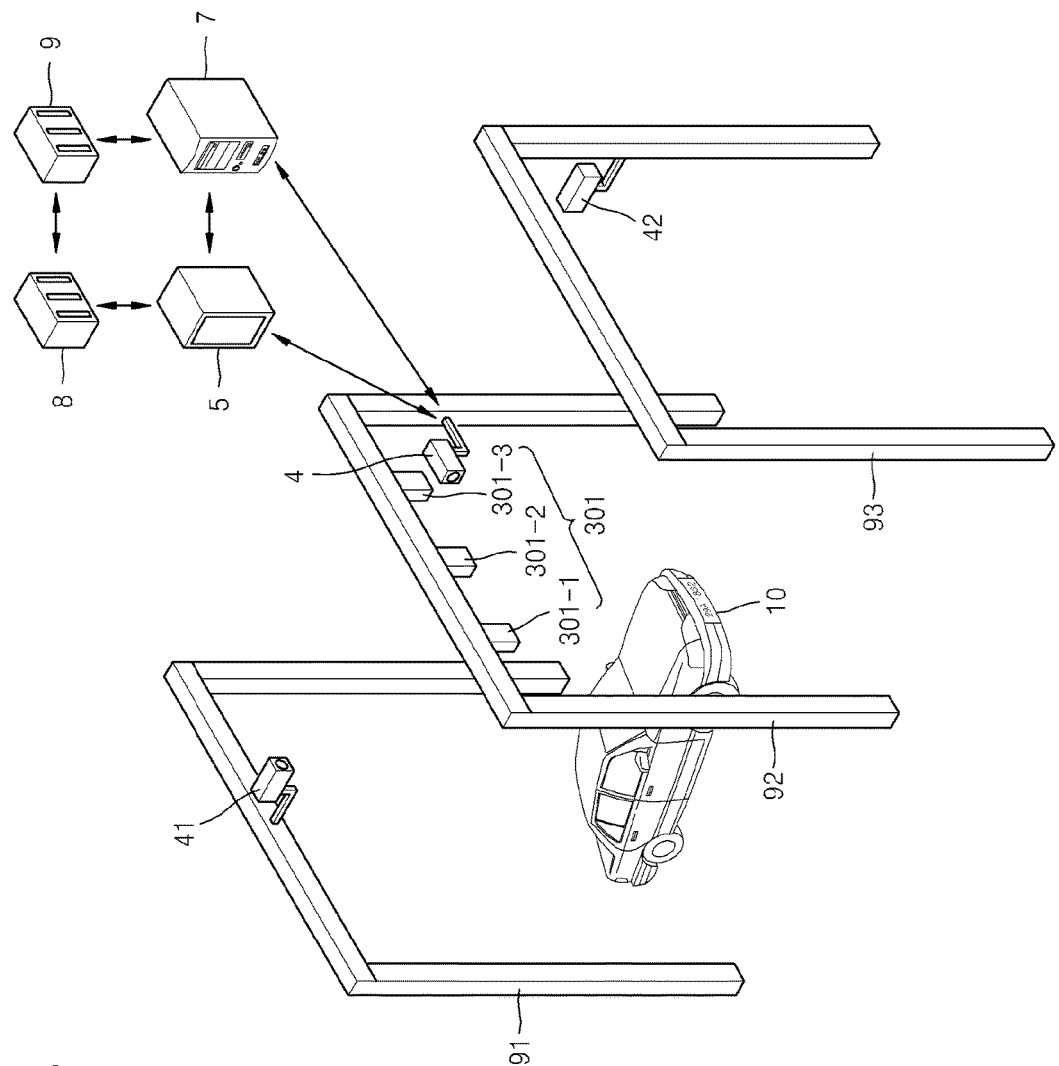

Error report listener function: a function of receiving an error of a program that is being executed Digital rights management (DRM) checker function: a function of checking if an open platform SW DRM FIGS. 2 and 3 illustrate an example of a protocol conversion method used for an image processing apparatus based on an open platform, according to exemplary embodiments.

FIG. 2 shows an example of performing a vehicle's plate number recognition in a parking lot, according to an exemplary embodiment. In the case of the vehicle's plate number recognition performed in a parking lot, a vehicle temporarily stops at an entrance of the parking lot, a gate 201 is opened, and then, the vehicle gets into or out of the parking lot. Thus, it is not necessary to process the vehicle's plate number recognition at a high speed.

Accordingly, the open platform-compatible unit 220 requests the network camera 100 for an image that is encoded by using a codec such as H.264 or moving picture experts group (MPEG), and decodes an image that is received from the protocol conversion unit 230. Then, the video analysis unit 270 extracts information about a vehicle's plate number from the decoded image.

FIG. 3 illustrates an example of a video analysis application for performing a vehicle's plate number recognition at a Hi-pass system, which is a Korean electronic toll collection system on highways. In order to perform recognition of a number plate of a vehicle that passes through the Hi-pass system, a detection unit 301, including subunits 301-1 to 301-3, for detecting driving of a vehicle is installed at an upper part of a second gantry 92, and network cameras 42 and 41, other than the detection unit 301, are respectively installed at a front and rear of the second gantry 92. Additionally, a toll collection process is performed on a vehicle that passes through the Hi-pass system via a toll controller 5, a road lane controller 7, an image server 9, and a toll collection center 9.

A video analysis application that performs the vehicle's plate number recognition at the Hi-pass system needs to recognize a vehicle's plate number that is installed in a vehicle that drives at a speed of 100 km per hour or higher, and at the same time, charge a toll for the vehicle having the vehicle's plate number.

As such, in the case of the Hi-pass system that operates at a high speed, a video analysis application may transmit data without undergoing an encoding process so as to reduce time required for decoding data and extracting information. Accordingly, in this case, the open platform-compatible unit 220, shown in FIG. 2, requests the video analysis application for an original image (that is, image that is not encoded) having a high resolution.

As described above, according to the one or more exemplary embodiments above, an image processing apparatus based on an open platform may apply an existing library or protocol to a new image analysis program or program without additional development.

In addition, other exemplary embodiments can also be implemented through computer-readable code/instructions in/on a medium, e.g., a computer-readable medium, to control at least one processing element to implement any above-described embodiment. The medium can correspond to any medium/media permitting the storage and/or transmission of the computer-readable code.

The computer-readable code can be recorded/transferred on a medium in a variety of ways, with examples of the medium including recording media, such as magnetic storage media (e.g., ROM, floppy disks, hard disks, etc.) and optical recording media (e.g., CD-ROMs or DVDs), and transmission media such as Internet transmission media. Thus, the medium may be such a defined and measurable structure including or carrying a signal or information, such as a device carrying a bit stream according to one or more embodiments. The media may also be a distributed network, so that the computer-readable code is stored/transferred and executed in a distributed fashion. Furthermore, the processing element could include a processor or a computer processor, and processing elements may be distributed and/or included in a single device.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. An image processing system comprising:
   a network camera configured to capture an original image of an object;
   a detector configured to detect a speed of movement of the object;
   an image processing apparatus comprising at least one processor to implement:
      an open platform-compatible unit configured to determine a protocol that is used by a video analysis application installed in or connected to the image processing apparatus, select channel information from among channel information about the original image, channel information about an encoded image of the original image, and channel information about a decoded image of the encoded image, according to the determined protocol, and receive the selected channel information; and
      a protocol conversion unit configured to process an input image to comply with the determined protocol, based on the channel information that is received at the open platform-compatible unit,
   wherein the open platform-compatible unit selects and receives the channel information about the original image based on the speed detected by the detector being over a predetermined threshold, and the open platform-compatible unit selects and receives the channel information about at least one from among the encoded image and the decoded image based on the speed detected by the detector being under the predetermined threshold.

2. The image processing system of claim 1, wherein the protocol conversion unit comprises:
   a reception unit, implemented by the at least one processor, configured to receive the input image based on the received channel information;
   a decoding unit, implemented by the at least one processor, configured to decode the input image; and
   at least one of a resizing unit, implemented by the at least one processor, configured to change a resolution of the decoded input image according to the determined protocol and a resampling unit, implemented by the at least one processor, configured to change a frame rate of the decoded input image according to the determined protocol.

3. The image processing system of claim 2, wherein the protocol conversion unit further comprises:
   a storing unit, implemented by the at least one processor, configured to store a part or whole of the decoded input image; and
   a transmission unit, implemented by the at least one processor, configured to transmit an image output from the at least one of the resizing unit and the resampling unit.

4. The image processing system of claim 1, wherein the input image is received from a channel selected by the open platform-compatible unit from among a plurality of channels based on the determined protocol.

5. The image processing system of claim 1, wherein in response to the channel information about the decoded image being received, the open platform-compatible unit further receives resolution information about the decoded image and frame rate information.

6. The image processing system of claim 1, wherein in response to the determined protocol supporting video analysis of the object moving at a predetermined location or time, the open platform-compatible unit selects and receives the channel information about the original image from among the channel information about the original image, the channel information about the encoded image, and the channel information about the decoded image.

7. The image processing system of claim 1, wherein in response to the determined protocol supporting video analysis of the object moving at a predetermined location or time, the open platform-compatible unit selects and receives the channel information about the encoded image from among the channel information about the original image, the channel information about the at least one from among the encoded image and the decoded image, and the channel information about the decoded image.

8. An image processing system comprising:
   a network camera configured to capture an original image of an object;
   a detector configured to detect a speed of movement of the object;
   an image processing apparatus comprising at least one processor to implement:
      an open platform-compatible unit configured to determine a protocol that is used by a video analysis application installed in or connected to the image processing apparatus, select a channel from among a channel through which the original image is to be received, a channel through which an encoded image of the original image is to be received, and a channel through which a decoded image of the encoded image is to be received, according to the determined protocol, and receive the original image, the encoded image or the decoded image through the selected channel; and
      a protocol conversion unit configured to process the received image received at the open platform-compatible unit according to the determined protocol,
   wherein the open platform-compatible unit selects the channel through which the original image is to be received based on the speed detected by the detector being over a predetermined threshold, and the open platform-compatible unit selects the channel through which at least one from among the encoded image and the decoded image is to be received based on the speed detected by the detector being under the predetermined threshold.

9. The image processing system of claim 8, wherein the open platform-compatible unit is further configured to determine a frame rate at which the decoded image is to be received, in response to receiving the decoded image through the selected channel.

10. The image processing system of claim 8, wherein the protocol conversion unit comprises at least one of a resizing unit, implemented by the at least one processor, configured to change a resolution of the received image according to the protocol and a resampling unit, implemented by the at least one processor, configured to change a frame rate of the received image according to the determined protocol.

11. An image processing method comprising:
   receiving an input image of an object from a network camera;

detecting, by a detector, a speed of movement of the object;

determining a protocol that is used by a video analysis application installed in or connected to an image processing apparatus;

selecting channel information from among channel information about an original image of the object, channel information about an encoded image of the original image, and channel information about a decoded image of the encoded image, according to the determined protocol, and receiving the selected channel information; and processing the input image to comply with the determined protocol based on the channel information that is received at an open platform-compatible unit, wherein the selecting the channel information comprises selecting the channel information about the original image based on the speed detected by the detector being over a predetermined threshold, and selecting the channel information about at least one from among the encoded image and the decoded image based on the speed detected by the detector being under the predetermined threshold.

12. The method of claim 11, wherein the processing comprises:

receiving the input image based on the received channel information;

decoding the received input image; and changing, according to the determined protocol, at least one of a resolution of the decoded input image and a frame rate of the decoded input image.

13. The method of claim 12, wherein the processing further comprises:

storing a part or whole of the decoded input image; and transmitting an image output from the changing.

14. The method of claim 11, further comprising requesting the input image from a channel selected from among a plurality of channels based on the determined protocol.

15. The method of claim 11, wherein the selecting the channel information further comprises selecting the channel information about the original image from among the channel information about the original image, the channel information about the encoded image, and the channel information about the decoded image, in response to the determined protocol supporting video analysis of the object moving at a predetermined location or time.

16. The method of claim 11, wherein the selecting the channel information further comprises selecting the channel information about the at least one from among the encoded image and the decoded image from among the channel information about the original image, the channel information about the encoded image, and the channel information about the decoded image, in response to the determined protocol supporting video analysis of the object moving at a predetermined location or time.

17. The image processing apparatus of claim 1, wherein the open platform-compatible unit, when executed by the at least one processor, supports an open platform module to perform a function of installing a program that is developed based on an open platform.

* * * * *